United States Patent
Heinemann et al.

(10) Patent No.: US 9,446,712 B2
(45) Date of Patent: Sep. 20, 2016

(54) MOTOR VEHICLE COMPRISING AN ELECTRONIC REAR-VIEW MIRROR

(71) Applicant: AUDI AG, Ingolstadt (DE)

(72) Inventors: Patrick Heinemann, Koesching (DE); Andreas Reich, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/382,890

(22) PCT Filed: Dec. 19, 2012

(86) PCT No.: PCT/EP2012/005246
§ 371 (c)(1),
(2) Date: Sep. 4, 2014

(87) PCT Pub. No.: WO2013/131543
PCT Pub. Date: Sep. 12, 2013

(65) Prior Publication Data
US 2015/0042803 A1 Feb. 12, 2015

(30) Foreign Application Priority Data
Mar. 7, 2012 (DE) .......................... 10 2012 004 793

(51) Int. Cl.
*B60R 1/00* (2006.01)
(52) U.S. Cl.
CPC ............ *B60R 1/00* (2013.01); *B60R 2300/804* (2013.01); *B60R 2300/806* (2013.01); *B60R 2300/8046* (2013.01)
(58) Field of Classification Search
CPC ............ B60R 1/12; B60R 2001/1253; B60R 2001/1215; B60R 2300/105; B60R 1/04; B60R 1/06; B60R 2011/0033; B60R 21/01566; B60R 2300/8026; B60R 2300/804; B60R 2300/806; B60R 2300/802; B60R 2300/8066; B60K 2350/1024; B60K 2350/01
See application file for complete search history.

(56) References Cited

U.S. PATENT DOCUMENTS

| 5,680,123 | A | 10/1997 | Lee | |
|---|---|---|---|---|
| 2002/0003571 | A1* | 1/2002 | Schofield | B60C 23/00 348/148 |
| 2002/0186201 | A1 | 12/2002 | Gutta et al. | |
| 2008/0297483 | A1* | 12/2008 | Kim | G06F 3/04817 345/173 |

(Continued)

FOREIGN PATENT DOCUMENTS

| CN | 101535087 | 9/2009 |
|---|---|---|
| DE | 1 930 203 A1 | 6/2008 |

(Continued)

OTHER PUBLICATIONS

Office Action issued Oct. 4, 2012 for corresponding German Patent Application No. 10 2012 004 793.2

(Continued)

*Primary Examiner* — Mehrdad Dastouri
*Assistant Examiner* — Obafemi Sosanya
(74) *Attorney, Agent, or Firm* — Staas & Halsey LLP

(57) ABSTRACT

A motor vehicle has at least one electronic rearview mirror, particularly an exterior and/or side mirror, that has an indicator apparatus, particularly a display, for images recorded by an exterior camera that is provided particularly outside the motor vehicle. The indicator apparatus is in the form of a touchscreen, particularly one with multitouch capability.

15 Claims, 3 Drawing Sheets

(56) References Cited

U.S. PATENT DOCUMENTS

| | | | |
|---|---|---|---|
| 2010/0182432 A1 | 7/2010 | Augst | |
| 2012/0032899 A1 | 2/2012 | Waeller et al. | |
| 2012/0272193 A1* | 10/2012 | Michaelis | B60K 37/06 715/863 |
| 2013/0057397 A1* | 3/2013 | Cutler | B62D 15/0255 340/435 |

FOREIGN PATENT DOCUMENTS

| | | |
|---|---|---|
| DE | 10 2007 044 536 A1 | 3/2009 |
| DE | 10 2009 008 041 A1 | 8/2010 |
| DE | 10 2012 004 793.2 | 3/2012 |
| EP | PCT/EP2012/005246 | 12/2012 |

OTHER PUBLICATIONS

International Search Report mailed Feb. 21, 2013 for corresponding International Patent Application No. PCT/EP2012/005246.

English Translation of the International Preliminary Report on Patentability mailed Sep. 12, 2014 for corresponding International Patent Application No. PCT/EP2012/005246.

Chinese Office Action dated Jul. 27, 2015 from Chinese Patent Application No. 201280045618.9, 12 pages.

Zhang et al., "Master iPad2", China Electric Power Press, 2011, 5 pages.

Chinese Office Action dated Feb. 6, 2016 from Chinese Patent Application No. 201280045618.9, 8 pages.

* cited by examiner

MOTOR VEHICLE COMPRISING AN ELECTRONIC REAR-VIEW MIRROR

CROSS REFERENCE TO RELATED APPLICATIONS

This application is based on and hereby claims priority to International Application No. PCT/EP2012/005246 filed on Dec. 19, 2012 and German Application No. 10 2012 004 793.2 filed on Mar. 7, 2012, the contents of which are hereby incorporated by reference.

BACKGROUND

The invention relates to a motor vehicle, comprising at least one electronic rearview mirror, particularly an exterior and/or side mirror, that has a display, for images recorded by an exterior camera.

Electronic rearview mirrors, particularly electronic exterior mirrors and/or side mirrors, have already been proposed in the related art. In the case of this type of exterior mirror, a virtual mirror is provided, that is to say that instead of a mirror surface an indicator apparatus, particularly a display, is used that presents data that are recorded by an exterior camera that is arranged particularly in the exterior mirror itself. However, embodiments are also known in which the indicator apparatus is arranged in the interior of the motor vehicle, for example in the region of the A pillar. In this case, general systems are known in which a firmly defined (camera) viewing angle is provided for the image represented on the indicator apparatus.

In the meantime, however, systems have also been proposed that allow the camera to be adjusted, for example. This involves the use of a swivel device that allows the camera system to have its inclination or angle readjusted in order to replace mirror adjustment.

In the subsequently published patent application DE 10 2011 118 253.9 from the applicant, it has also been proposed that the exterior camera, which is particularly in the form of a wide angle camera, records a relatively large area and only an image detail—which can be adjusted by a user and/or automatically—from an image recorded by the exterior camera is presented on the indicator apparatus. The latter thus displays an image detail from the camera image that can be selected by the user or on the basis of the situation.

Both swiveling of the camera and selection of an image detail can thus provide a driver with the opportunity to alter the viewing angle presented in the mirror, whether by virtue of the mechanical swiveling of the camera or by virtue of the selection of a particular image detail. Automatic adjustment of the viewing angle has also already been proposed, an automatic change possibly being rather undesirable in some situations. In these situations, driver interaction is necessary.

While a mirror surface of a conventional rearview mirror is a fixed unit without many degrees of freedom for the adjustment thereof, it is therefore entirely the case that said degrees of freedom for the adjustment exist for an indicator apparatus not only with respect to the image detail or the swiveling of the camera but also with respect to other presentation parameters. Since electronic rearview mirrors can also have driver assistance systems combined with them, which then show inserted images, for example, the number of adjustment options that a driver might wish to influence is increased further.

EP 1 930 203 A1 relates to a parking assistance apparatus that is meant to allow a vehicle to be positioned such that power transmission with a permanently installed appliance is also possible. The parking assistance apparatus has a backward-directed camera, the images from which can be presented on a touch display that is also used for controlling the parking assistance apparatus.

US 2002/0186201 A1 relates to the tracking of vehicles and the identification of emergency/law enforcement vehicles. In this case, at least one camera is provided, the video images from which are presented on a display within the motor vehicle, wherein the display may be a touchscreen that can be used to select image areas for closer analysis or can be used to actuate motors relating to the adjustment of the camera.

U.S. Pat. No. 5,680,123 relates to a vehicle monitoring system that has a plurality of video cameras for recording and presenting objects that are not directly visible. In this case, the display may be a touchscreen on which a menu can be presented in order to select different modes of view for a camera.

DE 10 2009 008 041 A1 relates to a method for operating a motor vehicle having a touchscreen, wherein additionally a gesture recognition module is provided in order to be able to use the touchscreen even without touching it.

SUMMARY

One potential object is to provide a specific, advantageous opportunity—that is easily comprehensible to the driver—for controlling an electronic rearview mirror and/or related vehicle systems.

The inventors propose the use of a touch sensitive display, particularly one with multitouch capability, in such a camera monitor system, that is to say an electronic rearview mirror. This provides a large number of interaction opportunities for the driver that can be learned and are comprehensible in a particularly intuitive manner, which will be discussed in more detail below.

Touchscreens, as are used as part of the proposal, are already widely known in the related art. They have a spatially resolving sensor system associated with the presentation surface, said sensor system being able to detect a touch on the presentation surface, particularly at least a touch by a finger, in a positionally accurate manner. This allows interaction with contents presented on the touchscreen.

With particular preference, this involves the use of a display with multitouch capability, that is to say that the sensor system is designed to detect touches, particularly by a finger, that occur at various locations simultaneously, which means that not only is it possible to track gestures and touches that can be performed by a finger, but rather it is also possible to perform more complex control actions requiring two or more fingers.

In particular, a control device associated with the touchscreen is thus designed to also ascertain and correctly evaluate movements and/or gestures that are recorded on the touch-sensitive presentation surface by the sensor system.

In a specific embodiment, provision is made for a control device to be provided for controlling the electronic rearview mirror and/or at least one further vehicle system on the basis of an input made using the touchscreen. The inputs sensed in the touchscreen and particularly preevaluated are therefore evaluated in order to produce therefrom control parameters and/or control commands for controlling the electronic exterior mirror and/or at least one further vehicle system, so that the touchscreen can therefore be used to intuitively adjust possible parameters.

In one advantageous embodiment, provision may be made for at least one presentation parameter for the indicator apparatus, particularly the brightness and/or the contrast and/or a color parameter, to be able to be adjusted using the touchscreen. By way of example, it is thus conceivable for presentation parameters to be adjustable for the visual impression of the image presented on the display by directly using the touchscreen on the indicator apparatus. The driver can make the image lighter or darker, can select the contrast and can also adjust further common parameters, in particular color-related parameters. In this case, in an expedient embodiment, provision may be made for the control device to be designed to show a slide control for the presentation parameter on the indicator apparatus. Following selection of a particular adjustment option, which can be accomplished using a menu, a particular gesture and/or a presented control element, the presentation surface of the touchscreen therefore shows a slide control that can be grasped and manipulated by touching the location of the slide control, for example, in order to adjust the presentation parameter. It goes without saying that other options are also conceivable for making a presentation parameter adjustable, for example control elements denoted by "+" and/or "−" that are shown on the presentation surface and that trigger an increase or decrease in the presentation parameter as appropriate when a touch is sensed thereon.

In a further embodiment, provision may be made for at least one operating parameter of at least one vehicle system that uses the indicator apparatus to output a piece of information and/or a warning, particularly a driver assistance system, to be able to be adjusted on the basis of an input on the touchscreen. Thus, if a further vehicle system uses the indicator apparatus as well, for example in order to output a warning and/or a piece of advice, it is a particularly intuitive matter to be able to immediately also allow adjustment of operating parameters of the vehicle system using the touchscreen at a location that the driver associates with the operation of the vehicle system anyway, namely the indicator apparatus. Specifically, the driver assistance system provided in this case may be a lane change assistance system and/or a blind spot assistance system and/or a parking aid and/or a reversing assistance system. Such systems provide assistance functions that are relatively closely connected to the rear space of the motor vehicle or to the electronic rearview mirror anyway.

In an expedient development, at least one piece of additional information that is shown in the image and presented on the indicator apparatus may be configurable, in particular displaceable, by interaction at the presentation location of the additional information in the presentation. If a piece of additional information, for example a warning and/or a piece of advice from a driver assistance system, is therefore displayed, it is possible for direct interaction with the presented piece of additional information to take place, for example by virtue of said information being able to be shifted to another presentation location or a menu associated with the additional information and/or with the driver assistance system opening on a context-sensitive basis in the event of a touch for the purpose of adjusting further presentation parameters and/or operating parameters of the driver assistance system. Such a piece of additional information may relate to a distance measurement for an object situated behind the motor vehicle during reversing or the like, for example.

As has already been mentioned, provision may expediently be made for the control device to be designed to present on the indicator apparatus at least one, in particular context-sensitive, menu that can be controlled by the touchscreen. Thus, particularly on the basis of where the menu has been called by a touch and/or a gesture, it is possible to present a menu that allows the adjustment of parameters that can then be taken as a basis for actuating the electronic rearview mirror and/or the at least one further vehicle system.

In a case in which two electronic exterior and/or side mirrors are provided on opposite sides of the motor vehicle, it is probable that only one indicator apparatus of an electronic exterior and/or side mirror can actually be reached by the driver, particularly only the left-hand one in the case of right-hand traffic. Therefore, provision is made for when the electronic rearview mirror is an exterior and/or side mirror a touchscreen to be provided only on one exterior and/or side mirror and at least one parameter for an opposite exterior and/or side mirror can be adjusted from said touchscreen. In the case of right-hand traffic, for example, it is therefore possible to use the touchscreen of a left-hand exterior and/or side mirror to adjust a parameter for the right-hand exterior and/or side mirror, for example, for which purpose it is possible, for example, for there to be a control element that selects the other exterior and/or side mirror for the purpose of configuration thereof and/or of a vehicle system associated therewith. In this case, provision may be made for the presentation of the other exterior and/or side mirror to then be at least temporarily transferred, for example.

It is also particularly advantageous if the indicator apparatus is arranged in an interior of the motor vehicle. Although it is also conceivable, in principle, for indicator apparatuses provided on exterior mirrors to be in the form of a touchscreen, indicator apparatuses arranged in the interior of a motor vehicle, for example central electronic rearview mirrors and/or electronic side mirrors, are easier to reach and therefore easier to manage overall.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
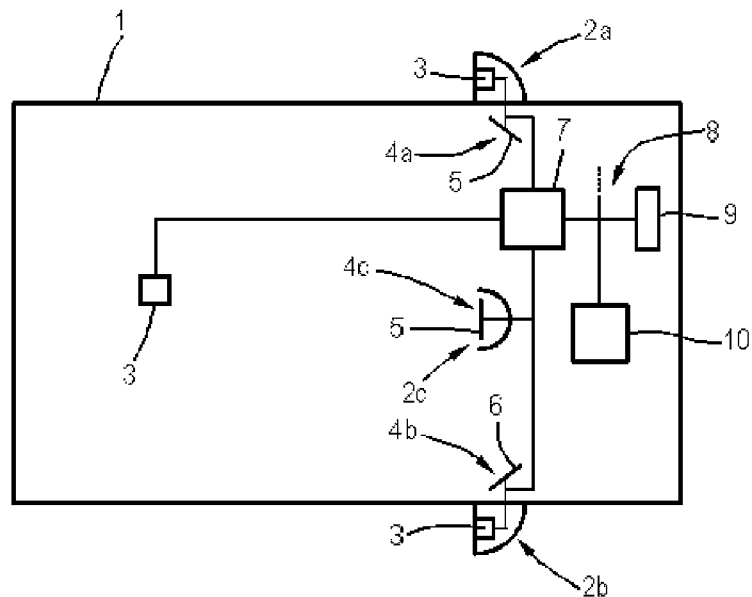
FIG. 1 shows a basic outline of a motor vehicle according to the inventors' proposals.

Reference will now be made in detail to the preferred embodiments of the present invention, examples of which are illustrated in the accompanying drawings, wherein like reference numerals refer to like elements throughout.

FIG. 1 shows a basic outline of an exemplary embodiment of a motor vehicle 1 according to the inventors' proposals. The motor vehicle 1 has three electronic rearview mirrors 2a, 2b and 2c. The electronic rearview mirrors 2a and 2b are side mirrors. The electronic rearview mirror 2c is a central rearview mirror in the motor vehicle 1. Each of the electronic rearview mirrors 2a, 2b and 2c has an associated exterior camera 3 that records the external surroundings of the motor vehicle 1 and that is oriented backward. The images or image details from the images from the camera can each be displayed on an indicator apparatus 4a, 4b or 4c, the indicator apparatuses 4a, 4b and 4c all being embodied as a display.

In this case, the indicator apparatuses 4a and 4c are each a touchscreen 5 that also has multitouch capability, and a sensor system of which can therefore also resolve a plurality of simultaneous touches. The indicator apparatus 4b is a standard display 6.

In the present case, the operation of the electronic rearview mirrors 2a, 2b and 2c is controlled centrally by a control device 7, but in another exemplary embodiment each of the electronic exterior mirrors 2a, 2b, 2c may also have associated dedicated control devices.

Via a bus system 8, in this case a CAN bus, the control device 7 is also in contact with further vehicle systems, of which a parking aid 9 and a lane change assistant 10 are shown here as driver assistance systems, which use the indicator apparatus 4a, 4b and 4c in order to output warnings and/or advice as additional information, which will be discussed in more detail below.

The touchscreens 5 can be used in order to make adjustments to the electronic exterior mirrors 2a, 2b and 2c, but also in order to configure the vehicle systems that jointly use the indicator apparatuses 4a, 4b, 4c, in this case the parking aid 9 and the lane change assistant 10, for example. In this case, the electronic rearview mirror 2c can be configured using a dedicated touchscreen 5, and the side mirrors, electronic rearview mirrors 2a and 2b, can both be configured using the touchscreen 5 of the left-hand electronic rearview mirror 2a, assuming right-hand traffic. Since the indicator apparatus 4a is situated inside the motor vehicle 1, the touchscreen 5 can also be easily reached.

Figure 2:
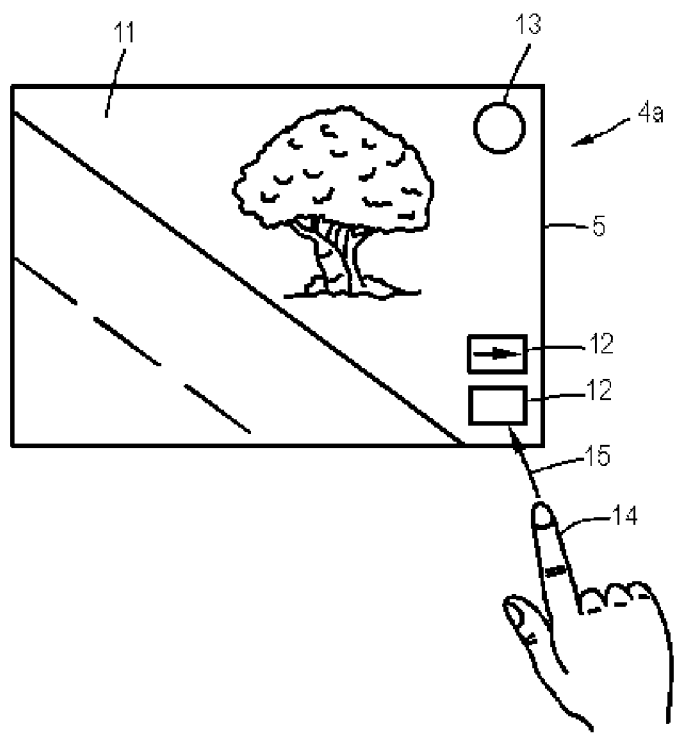
FIG. 2 shows a first possible presentation on the touchscreen.
Figure 3:
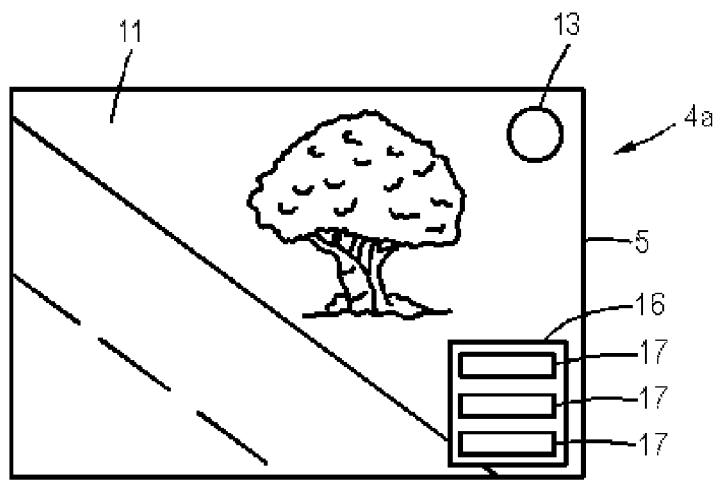
FIG. 3 shows a second possible presentation on the touchscreen.
Figure 4:
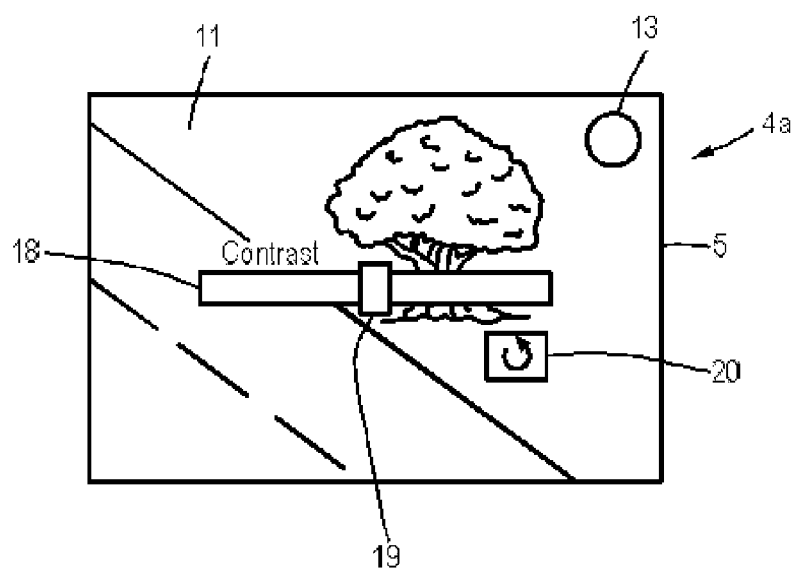
FIG. 4 shows a third possible presentation on the touchscreen.

FIGS. 2 to 4 show control options provided for the touchscreen 5 of the left-hand side mirror by way of example. As can be seen from FIG. 2, besides the image 11 on the indicator apparatus 4a, i.e. the touchscreen 5, symbols 12 that indicate control options are shown. In addition, the lane change assistance system 10 shows a piece of additional information 13, in this case a piece of advice or a warning concerning whether a change of lane is possibly dangerous. If the driver now uses a finger 14 to touch one of the symbols 12 or the additional information 13, menus or adjustment options open on a context-sensitive basis. While the upper symbol 12 affords changeover to an ability to adjust the right-hand side mirror, electronic rearview mirror 2b, the case that will now be considered more closely here is the one in which the symbol 12 on the touchscreen 5 is tapped by the finger 14, cf. arrow 15.

As FIG. 3 shows, the symbols 12 are then replaced by a menu 16, which in this case has a plurality of menu entries 17 that relate to presentation parameters, particularly for contrast, brightness and a color parameter. If the finger 14, for example, is now used to select the menu entry 17 associated with the contrast, the presentation in FIG. 4 is obtained, in which a slide control 18 with the word "Contrast" above it is displayed. The driver can now use the finger 14 to select the slider 19 presented on the touchscreen 5 and to move it, and hence to adjust the contrast, by virtue of a left-right movement of his finger on the touchscreen 5. He can also use a control element 20 to return to the menu 16.

In this case, it should be pointed out at this juncture that whenever no further control action is taking place, that is to say particularly no further touch on the touchscreen 5 is sensed, the system returns to the standard presentation in FIG. 2 again after a predetermined period of time.

In some exemplary embodiments, it is also conceivable to be able to return to the standard presentation in FIG. 2 by tapping on the touchscreen 5 outside presented control elements/menu entries.

When the additional information 13 is touched, a corresponding menu that allows adjustments from the lane change assistant 10, that is to say particularly in operating parameters for the lane change assistant 10, is obtained.

Figure 5:
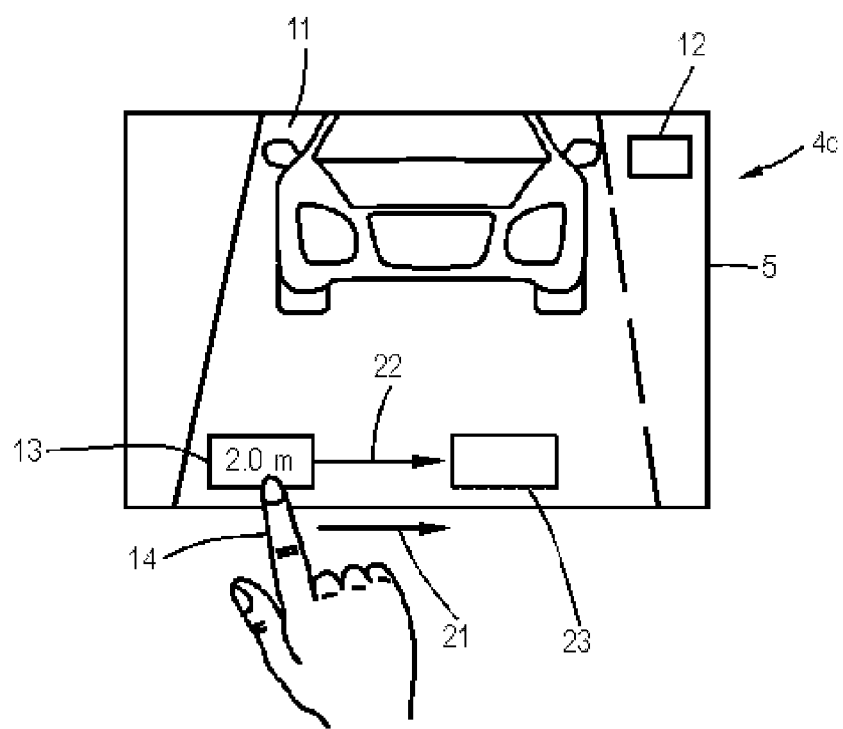
FIG. 5 shows an outline pertaining to the shifting of additional information.

FIG. 5 now shows a possible presentation on the indicator apparatus 4c of the central electronic rearview mirror 2c in which, in turn, in addition to the image 11, a piece of additional information 13 and a symbol 12 are presented. In this case too, the symbol 12 allows the adjustment of presentation parameters, as already described for FIGS. 2 to 4. The additional information 13 shown is a distance to an object situated behind the motor vehicle, in this case the further motor vehicle presented ("park distance"). This additional information 13 can now be selected using the finger 14. If the finger 14 is then shifted, arrow 21, the additional information 13 is also moved to a new position 23 in accordance with the arrow 22. It should be pointed out that it is naturally also possible for a context-sensitive menu for the additional information 13 to be implemented in this case, for example by virtue of said additional information being tapped twice within a predetermined time.

It is also possible for more complex gestures to be performed and used for control within the framework.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A motor vehicle, comprising:
    an exterior camera provided outside the motor vehicle;
        opposing side and/or exterior first and second electronic rear view mirrors, the first but not the second electronic rearview mirror having an indicator apparatus formed as a touchscreen to display images recorded by the exterior camera, the touchscreen having multitouch capability; and
    a control device:
        to control the first electronic rearview mirror and/or at least one further vehicle system based on user input made via the touchscreen; and
        to adjust a parameter for the second electronic rearview mirror based on user input made via the touchscreen of the first electronic rearview mirror,
    wherein
        the indicator apparatus displays images recorded by the exterior camera and displays a piece of additional information, and
        the control device displaces the piece of additional information, to move a display position of the piece of the additional information, based on user input made via the touchscreen, to slide the piece of additional information to a new location on the indicator apparatus.

2. The motor vehicle as claimed in claim 1, wherein the control device adjusts a presentation parameter for images displayed by the indicator apparatus, based on user input made via the touchscreen, the presentation parameter being at least one parameter selected from the group consisting of a brightness parameter, a contrast parameter and a color parameter.

3. The motor vehicle as claimed in claim 2, wherein the control device presents a slide control display on the indicator apparatus for a sliding touchscreen adjustment of the presentation parameter.

4. The motor vehicle as claimed in claim 1, wherein
the motor vehicle has a driver assistance system that outputs a piece of information or a warning via the indicator apparatus, and
the control device controls an operating parameter of driver assistance system based on user input made via the touchscreen.

5. The motor vehicle as claimed in claim 4, wherein the driver assistance system is at least one system selected from the group consisting of a lane change assistance system, a blind spot assistance system, a parking aid system and a reversing assistance system.

6. The motor vehicle as claimed in claim 1, wherein
the first electronic rearview mirror is a side mirror,
the motor vehicle has a lane change assistance system that outputs a piece of information or a warning via the indicator apparatus, and
the control device controls an operating parameter of the lane change assistance system based on user input made via the touchscreen.

7. The motor vehicle as claimed in claim 1, wherein
the motor vehicle further comprises a central mirror, the central mirror being an electronic rearview mirror having a central indicator apparatus formed as a touchscreen to display images recorded by the exterior camera,
the motor vehicle has a parking aid system that outputs a piece of information or a warning via the central indicator apparatus, and
the control device controls an operating parameter of the parking aid system based on user input made via the touchscreen of the central indicator apparatus.

8. The motor vehicle as claimed in claim 1, wherein the control device presents a context-sensitive menu on the indicator apparatus that can be controlled based on user input made via the touchscreen.

9. The motor vehicle as claimed in claim 1, wherein the indicator apparatus is arranged in an interior of the motor vehicle.

10. The motor vehicle as claimed in claim 1, wherein
the first electronic rearview mirror is a side mirror, and
the first electronic rearview mirror is provided on an A-pillar of the vehicle.

11. The motor vehicle as claimed in claim 1, wherein the first and second electronic rearview mirrors are side mirrors, each having a display for images recorded by the exterior camera, the display of the second electronic rearview mirror not being a touchscreen display.

12. The motor vehicle as claimed in claim 11, wherein
the display of the first electronic rearview mirror displays images recorded by a first exterior camera, and
the display of the second electronic rearview mirror displays images recorded by a second exterior camera.

13. The motor vehicle as claimed in claim 11, wherein the motor vehicle further comprises a central mirror, the central mirror being an electronic rearview mirror having a display for images.

14. The motor vehicle as claimed in claim 1, wherein
the control device is configured to simultaneously present on the touchscreen of the first electronic rearview mirror images recorded by the exterior camera together with an object, and
when the object is touched, the control device is configured to present on the touchscreen a control option to adjust the parameter for the second electronic rearview mirror.

15. The motor vehicle as claimed in claim 14, wherein
the first electronic rearview mirror is a first side mirror on one side of the motor vehicle, and includes the touchscreen to display the images recorded by the exterior camera, and
the second electronic rearview mirror is a second side mirror on another side of the motor vehicle opposing the one side of the motor vehicle, and includes a display which does not have touchscreen capability.

* * * * *